Feb. 11, 1958 E. P. WENZELBERGER 2,822,554
VARIABLE DENSITY FOAM CUSHIONS, PILLOW AND THE LIKE
Filed Jan. 7, 1955

INVENTOR
ELWOOD P. WENZELBERGER
BY
ATTORNEYS

United States Patent Office 2,822,554
Patented Feb. 11, 1958

2,822,554

VARIABLE DENSITY FOAM CUSHIONS, PILLOW AND THE LIKE

Elwood P. Wenzelberger, Dayton, Ohio, assignor to The Commonwealth Engineering Company of Ohio, Dayton, Ohio, a corporation of Ohio Application January 7, 1955, Serial No. 480,585

4 Claims. (Cl. 5—337)

The invention more particularly appertains to a variable density cushion or pillow which comprises an inflatable bag or tube having a load-supporting wall or layer of cellular resilient material, e. g. foamed rubber, synthetic resin or the like. The cellular layer of foamed resilient material may be integrally united to the wall of the tube or form a separate element which surrounds or forms a backing or supporting base for the cellular layer.

Heretofore it has been conventional practice to make seat cushions of soft spongy rubber, but it has been found that usually such cushions are either too soft or too springy. A pillow, for instance, made of soft spongy rubber allows one's head, when resting thereon, to sink down into the pillow creating a relatively deep cavity which is undesirable. Such a sponge rubber cushion in use creates the sensation of the head resting in a groove or depression which soon becomes uncomfortable.

In contrast to the characteristic properties of such cushion structures, a pillow stuffed with feathers, such as duck feathers, in use is soft and springy yet possesses sufficient stiffness to resist any tendency to form a deep groove or cavity and comfortably supports one's head on a shallow depression as compared to a pillow made entirely of foamed rubber or the like.

The present invention provides a pillow or cushion which is free of mechanical elements such as metal coils, springs, or the like. A cushion structure is provided which exhibits a softness and springiness similar to a pillow filled with duck feathers. The pillow of the invention comprises a combination of cellular resilient material and an inflatable tube or bag for varying the density or stiffness of the pillow in use.

In accordance with this invention, there is provided a pillow or cushion which is formed of foamed resilient material, e. g. rubber, resin or suitable plastic material. When made of foamed rubber the same is preferably cast on all sides or around an air tube or bladder or the like inner tube, which is inflatable, the foamed rubber and tube being cured together forming a unitary product. The foamed rubber may thus be cured in situ with the inner tube or inflatable bladder section. A valve is provided so that air can be admitted to the inner tube or inflate the same to the desired extent, or conversely operated to release air and deflate the tube. Foamed rubber forms an outer supporting surface. Preferably the foamed rubber is several inches thick, being generally from 1 to 6 inches and which surrounds the inner inflatable tube.

In the cushion or pillow structure of the present invention and employing sponge rubber as the foamed resilient material, the central portion comprises an inner inflatable bladder or flattened tube which is equipped with a valve whereby the tube can be inflated or deflected to the desired extent and retained at this pressure for long periods of time.

In accordance with this invention, an inner tube or bladder is inflated to a suitable pressure and then sponge rubber is molded onto the surface to form a soft resilient load-supporting wall or base. The sponge rubber may extend around the entire inner tube or, if desired, at the upper or load supporting surface. A pillow or cushion structure is thus provided which can be varied as to the amount of fluid pressure in the inner tube portion. In this manner the density or stiffness of the cushion or pillow may be varied to suit the individual user or the conditions of use.

The invention in the preferred form consists of a sponge rubber walled cushion which is provided with an inflatable inner tube or base portion.

The invention enables one to regulate or vary the density or softness of the cushion so that the same can be increased or decreased, as desired, to provide a softer or more yielding cushion.

These and other objects and advantages of the invention will become apparent as the description proceeds.

The various features of the invention are illustrated by way of example in the accompanying drawing, as applied to a cushion, pillow or mattress constructed in accordance with the invention in which.

Figure 1:
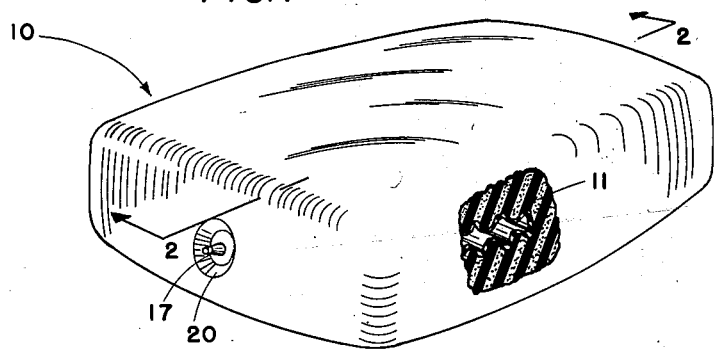
Figure 1 illustrates in perspective a pillow constructed in accordance with this invention; a portion of the same being cut away to better illustrate the structure thereof.
Figure 2:
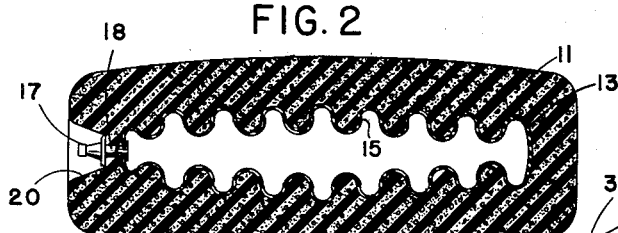
Figure 2 is a cross section taken substantially on the line 2—2 of Figure 1 and looking in the direction of the arrows.

Referring to the structure illustrated in Figures 1 and 2, a pillow 10 is shown which is formed of sponge rubber 11. The central portion of the pillow is provided with an inflatable inner tube or bladder 13 which is preferably provided with corrugated wall structure 15, as illustrated in Figure 2. The bladder or inner tube 13 is provided with a valve 17 and connecting stem 18 which communicates with the inner chamber of the tube for admitting fluid such as air into the interior of the tube to inflate or deflate the same. Valve stem 18 is arranged in the cavity 20 of the sponge rubber wall portion to provide a countersunk valve.

In the construction illustrated in Figures 1 and 2, the tube 13 preferably is partially inflated and placed in a suitably shaped mold and the sponge rubber material molded therearound, and heat cured to provide a unitary structure similarly as a one-piece tire. The corrugated wall 15 of the inner tube 13 is provided to increase the flexibility of the sponge rubber wall portion, and resist lateral distortion. The surrounding foam rubber which is of a thickness of from 1–6 inches extends around or envelopes the inner tube 13 and the sponge rubber and inner tube structure is molded to the shape of a pillow or cushion. After molding and curing, the cushion, the inner tube 13 may be inflated or deflated by admitting air into or outward past the valve 17. In this manner the pressure in the tube can be adjusted to provide a cushion having any desired density or hardness.

In the use of the cushion as a pillow, air may be blown into the tube either by placing the valve 17 in the mouth and blowing, or by utilizing a small hand pump, e. g., a bicycle pump. The valve, which is of similar construction and operation as a bicycle inner tube is adapted to hold the pressure during use of the cushion. If it is desired to deflate the cushion, then the valve 17 is opened or adjusted to allow air or fluid under pressure to escape from the inner tube 13 until the tube is deflated sufficiently.

Figure 3:
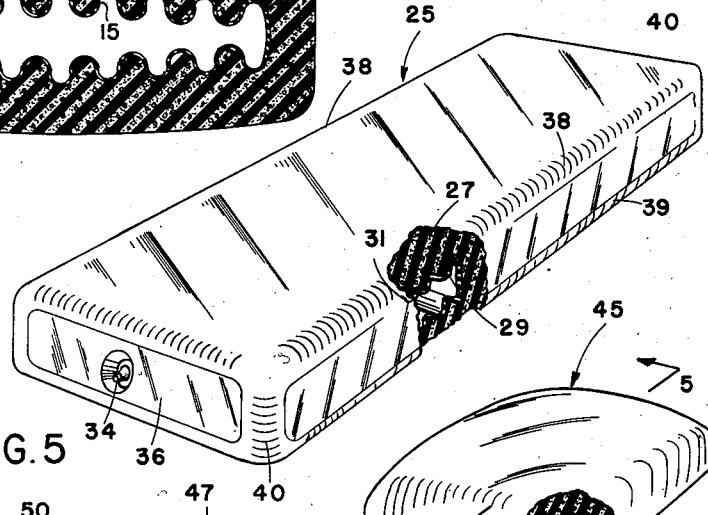
Figure 3 illustrates in perspective a mattress constructed similarly as the cushion of Figure 1, a portion of the mattress being cut away and shown in section, to better illustrate the structure thereof.

In Figure 3, a mattress 25 is shown which is made up of sponge rubber 27 and an inner inflatable tube 29 similarly as the cushion of Figures 1 and 2. The inner tube 29 comprises corrugated outer walls 31 similarly as the inner tube or bladder 13.

Valve 34 which is arranged at one end of the mattress and communicates with the inner tube 29 has the valve stem countersunk in the wall portion 36 thereof. In the mattress illustrated, reinforcing boundary side wall portions 38 and 39 and corners 40 are provided. These reinforcing wall portions are preferably made of solid rubber or porous rubber of greater density than the sponge rubber portion 27 which surrounds the inner tube 29. This construction provides a greater stiffness to the corners and side edges which resists forces tending to distort the mattress out of shape.

Figure 5:
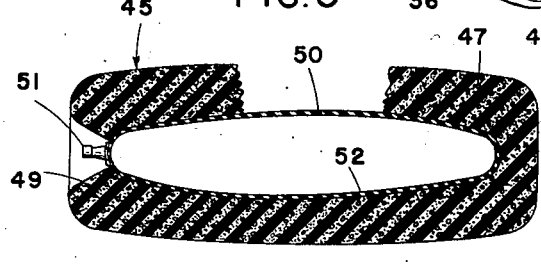
Figure 5 is a sectional view through a pillow structure as shown in Figure 4, and taken substantially on the line 5—5 and looking in the direction of the arrows, the section being drawn on a somewhat enlarged scale, as compared to Figure 4, and a portion of the cushion being cut away to illustrate the separate inner tube structure in this modification.
Figure 4:
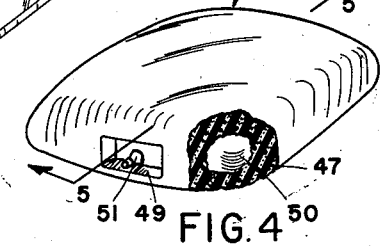
Figure 4 is a similar perspective view as Figure 1, and illustrating a modified pillow construction, and wherein a portion of the pillow is cut away and shown in section to illustrate the structure thereof.

In the construction illustrated in Figure 4, a pillow 45 is provided wherein the same is made of porous plastic material such as foamed vinylite resin, rubber or the like, as at 47. In this construction the pillow is molded and cured with an opening 49 at one end which is of sufficient size and dimensions so that an inner tube 50 and valve 51 can be inserted through the opening 49 and inflated to form a central air cushion. This cushion structure is better illustrated in Figure 5.

The inner tube or inflatable bladder 50, in this instance is preferably made separate from the porous or foamed plastic outer portion 47, and the walls 52 of the inner tube are made planar or smooth, similarly as the inner tube in an automobile tire. The inner tube can thus be removed and replaced or repaired. In this structure the valve 51 is positioned in the aperture 49 at the end of the cushion and controls the passage of air to and from the tube as when inflating or deflating the same.

In the manufacture of sponge rubber walled cushions, different materials may be used, for example synthetic resins which are foamable and resilient may be used in place of natural rubber. For example, sponge neoprene and various synthetic resins such as vinyl polyethylene and the like which are foamable and are soft and resilient are suitable for this purpose. The thickness of the foam rubber wall or support may also be varied, and if desired confined to selected areas with respect to the inner tube. The thickness of the foamed plastic wall is such as to produce a cushion or pillow which will withstand the load placed upon it without distorting laterally or tending to form deep cavity sections. Vulcanizable latex foam rubber may be utilized as the wall portions surrounding the inner tube.

An example of such sponge rubber compositions which is applicable and which is given merely as illustrative, and not for limitative purposes, comprises the following (by volume) neoprene latex (50% rubber), 400 parts sodium silicate solution (41° Bé.) 9 parts plasticizer (castor oil), 8 parts sensitizer (sodium silico fluoride 25% dispersion in water).

The ingredients are added in the order given and rapidly agitated. After the plasticizer is added nitrous oxide is introduced and the mixture is foamed to increase its volume to about 450%. Thereafter the sensitizer is admixed therewith, dissolved in approximately 50 parts of water, while continuing the stirring of the mass. The foamed mass is thereafter placed in a mold having the desired thickness of wall, with or without an inner tube, and cured under infra-red light for approximately 15 minutes. Thereafter the final curing treatment of approximately one hour at 250° F. is carried out to produce the finished cushion. Other suitable foamed or porous synthetic plastic material may be used, e. g. vinylite plastisol resins which are flame and chemical resistant and produce springy foams.

If desired, the sponge or foamed rubber wall portion of the cushion may be formed to any desired shape and the same provided with recesses or voids of larger size than the porous structure of the foamed rubber body of resilient material so as to provide a modified cushion effect. In the making of foamed plastisols, gas pressure brings about expansion of the material to a consistency of thick whipped cream as it is transferred to an open mold. Thereafter the mold is closed and the foam cured at about 250° F. for one hour. It is then easily stripped from the mold.

Modifications of the cushion structure and substitution of materials may be made in practicing the invention without departing from the principles employed, and which is defined with more particularity by the appended claims.

What is claimed is—

1. A cushion or pillow comprising an elongated sponge rubber body having a central cavity extending lengthwise of said sponge rubber body, said central cavity having corrugated walls to provide increased flexibility and to resist lateral distortion of said sponge rubber body, an inflatable inner tube disposed in said cavity and having the side walls contiguous with said corrugated cavity walls, and a valve stem communicating with said inner tube and having a valve therein for controlling the passage of inflating gas admitted to and released from said tube, said valve stem being countersunk into said sponge rubber body, and said inner tube being inflated to provide a sponge rubber cushion of a requisite hardness.

2. A method of making a cushion or pillow of the character described, which comprises establishing an elongated inflatable bag having corrugated side walls, partially inflating said bag, molding foamed plastic material about said inflated bag and contiguous with the corrugated walls thereof, and heat curing said foamed plastic material and bag in situ to produce an integral one-piece cushion structure having an elongated cavity surrounded by corrugated walls.

3. A method of making a cushion or pillow of the character described, which comprises providing an elongated, inflatable corrugated member having a valve for admitting air thereto, partially inflating said member while retaining said corrugations in the walls thereof, molding foamed plastic rubber about said corrugated and partially inflated member and contiguous with the corrugated walls thereof, and heat-curing said foamed plastic rubber having a corrugated inner member in situ, to produce an integral one-piece cushion structure.

4. A cushion or pillow comprising an elongated sponge rubber body having a central cavity extending lengthwise of said sponge rubber body, said central cavity having corrugated walls to provide increased flexibility and to resist lateral distortion of said sponge rubber body, an inflatable tube disposed in said cavity and having the side walls contiguous with said corrugated cavity walls, and means for communicating with said inner tube and having a valve therein for controlling the passage of inflating gas admitted to and released from said tube, and whereby said inner tube may be inflated to provide a sponge rubber cushion of a requisite hardness.

References Cited in the file of this patent

UNITED STATES PATENTS

| Number | Name | Date |
| --- | --- | --- |
| 1,614,853 | Schwartz | Jan. 18, 1927 |
| 2,069,422 | Sampson | Feb. 2, 1937 |
| 2,145,731 | Minor | Jan. 31, 1939 |
| 2,234,506 | Sistig | Mar. 11, 1941 |
| 2,434,641 | Burns | Jan. 20, 1948 |
| 2,521,530 | McGuffage | Sept. 5, 1950 |
| 2,604,663 | Talalay | July 29, 1952 |
| 2,748,399 | Rockoff | June 5, 1956 |